United States Patent
Matsunaga (10) Patent No.: US 10,493,678 B2
(45) Date of Patent: Dec. 3, 2019

(54) TWO-COLOR MOLDING METHOD, TWO-COLOR MOLDING MOLD, AND TWO-COLOR MOLDED ARTICLE

(71) Applicant: KOITO MANUFACTURING CO., LTD., Tokyo (JP)

(72) Inventor: Kenichi Matsunaga, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 347 days.

(21) Appl. No.: 14/921,471

(22) Filed: Oct. 23, 2015

(65) Prior Publication Data
US 2016/0114718 A1 Apr. 28, 2016

(30) Foreign Application Priority Data

Oct. 28, 2014 (JP) ................................ 2014-218827

(51) Int. Cl.
*B29C 45/16* (2006.01)
*F21S 41/20* (2018.01)
(Continued)

(52) U.S. Cl.
CPC .............. *B29C 45/16* (2013.01); *F21S 41/28* (2018.01); *B29C 45/1675* (2013.01);
(Continued)

(58) Field of Classification Search
CPC . B29C 45/16; F21S 43/50; F21S 41/50; F21S 41/37; F21S 41/28; F21S 43/26;
(Continued)

(56) References Cited

U.S. PATENT DOCUMENTS 4,874,654 A * 10/1989 Funaki .................... B29C 45/16
428/192
5,516,551 A * 5/1996 Anderson ................ B05D 7/02
427/195

(Continued)

FOREIGN PATENT DOCUMENTS

CN   101905510 A * 12/2010
EP      1177876 A1 * 2/2002 ............. B29C 45/16
(Continued)

OTHER PUBLICATIONS

Translation of CN101905510A; published Dec. 8, 2010.*
(Continued)

*Primary Examiner* — Catherine A. Simone
(74) *Attorney, Agent, or Firm* — Abelman, Frayne & Schwab (57) ABSTRACT

Disclosed is a two-color molded front cover of a vehicular lamp. The front cover includes a light transmissive resin portion, and a black resin portion integrally molded on a part of a peripheral edge portion (first surface) of the light transmissive resin portion. A cover portion formed by a part of the black resin portion is formed on a peripheral side portion (second surface) of the light transmissive resin portion which is adjacent to the peripheral edge portion. Since a non-uniform black resin portion is not formed on the peripheral side surface of the light transmissive resin portion, the appearance of the light transmissive resin portion of the front cover is improved.

6 Claims, 7 Drawing Sheets

(51) Int. Cl.
*B32B 3/02* (2006.01)
*B32B 27/08* (2006.01)
*B29L 31/30* (2006.01)
*B29L 31/00* (2006.01)
*B29C 45/33* (2006.01)

(52) U.S. Cl.
CPC ...... *B29C 45/33* (2013.01); *B29C 2045/1682* (2013.01); *B29K 2995/0021* (2013.01); *B29K 2995/0025* (2013.01); *B29K 2995/0026* (2013.01); *B29L 2031/3005* (2013.01); *B29L 2031/747* (2013.01); *B32B 3/02* (2013.01); *B32B 27/08* (2013.01); *B32B 2250/02* (2013.01); *B32B 2250/24* (2013.01); *B32B 2307/41* (2013.01); *B32B 2307/412* (2013.01); *B32B 2605/08* (2013.01)

(58) Field of Classification Search
CPC ..... B32B 3/02; F21V 7/00; F21V 7/22; F21V 3/04; Y10T 428/24777; Y10T 428/2419; Y10T 428/24215; Y10T 428/24198; Y10T 428/24264; Y10T 428/24231; Y10T 428/24248; Y10T 428/24256
USPC ....... 362/488, 490, 493, 507, 459, 460, 546, 362/549, 487; 428/192, 81
See application file for complete search history.

(56) References Cited

U.S. PATENT DOCUMENTS

| | | | | |
|---|---|---|---|---|
| 5,599,608 | A | * | 2/1997 | Yamamoto ............ B29C 43/021 156/233 |
| 5,721,039 | A | * | 2/1998 | Yanagihara ........... B29C 45/062 359/642 |
| 6,093,467 | A | * | 7/2000 | Forry ..................... F16J 15/104 277/590 |
| 7,344,669 | B2 | * | 3/2008 | Yamamoto ........ B29C 45/14196 264/247 |
| 2014/0252804 | A1 | * | 9/2014 | Schmidt .................. B60R 13/04 296/193.06 |

FOREIGN PATENT DOCUMENTS

| | | | | |
|---|---|---|---|---|
| EP | 1695808 A1 | * | 8/2006 | ............ B29C 45/16 |
| EP | 1695808 A1 | | 8/2006 | |
| JP | 2011-187299 A | | 9/2011 | |
| JP | 2014176974 A | * | 9/2014 | ............ B29C 45/16 |
| WO | WO-2013041367 A1 | * | 3/2013 | ............ B60R 13/04 |

OTHER PUBLICATIONS

Translation of JP2014-176974A; published Sep. 25, 2014.*
Translation of EP1695808. (Year: 2006).*
An Office Action dated Jul. 11, 2018, issued from the Chinese State Intellectual Property Office of the P.R.C (SIPO) of Chinese Patent Application No. 201510649840.5 and an EN translation thereof.

* cited by examiner

TWO-COLOR MOLDING METHOD, TWO-COLOR MOLDING MOLD, AND TWO-COLOR MOLDED ARTICLE

CROSS-REFERENCE TO RELATED APPLICATIONS

This application is based on and claims priority from Japanese Patent Application No. 2014-218827, filed on Oct. 28, 2014, with the Japan Patent Office, the disclosure of which is incorporated herein in its entirety by reference.

TECHNICAL FIELD

The present disclosure relates to a so-called two-color molding technique that molds different resins integrally. In particular, the present disclosure relates to a two-color molding method and a two-color molding mold that are suitable for manufacturing a light transmission body as one of constituent elements of a lamp, and a two-color molded article that is molded using the molding method and mold.

BACKGROUND

A lamp such as, for example, a vehicular headlamp, takes a configuration in which a front cover as a light transmission body of a lamp housing that accommodates a lamp unit is formed of a light transmissive resin so as to transmit light emitted from the lamp unit through the front cover, thereby emitting the light toward a region in front of the vehicle. In the front cover, while an effective lighting portion—a region that transmits light therethrough—is molded only with a light transmissive resin, a non-effective lighting portion—a region that does not contribute to light distribution—is formed by laminating a colored light non-transmissive resin on a light transmissive resin so as to optically shield the inside of the lamp housing so that a part of the inside of the lamp cannot be visually recognized from the outside, thereby improving an external appearance. As disclosed in Japanese Patent Laid-Open Publication No. 2011-187299, such a front cover is frequently molded through a two-color molding method using a light transmissive resin and a light non-transmissive resin.

In the two-color molding method, a cavity is formed by a common mold and a primary mold, and a first resin portion is molded by introducing a first resin into the cavity. Subsequently, the primary mold is replaced with a secondary mold while the first resin portion is maintained in the common mold, and a second resin portion is molded by introducing a second resin into a cavity that is newly formed by the common mold and the secondary mold. Consequently, a two-color molded article in which the first resin portion and the second resin portion are integrated with each other is manufactured.

SUMMARY

As a method of molding a front cover as described above using the two-color molding, a two-color molding method is employed in which a light transmissive resin portion as the first resin portion is molded by the common mold and the primary mold, and a light non-transmissive resin portion as the second resin portion is molded by the common mold and the secondary mold. In such a case, when the front cover includes a light non-transmissive resin portion having an undercut, the light transmissive resin portion is molded first in order to prevent a slide line from being formed by a slider that forms the undercut in the light transmissive resin portion.

However, when the two-color molding method described above is employed, resin shrinkage in the light transmissive resin portion molded by the primary mold may cause appearance quality to be degraded. While a specific example will be described later, when the light transmissive resin portion, which is molded by the primary mold and left within the common mold, undergoes resin shrinkage, a fine clearance occurs between a side surface of the light transmissive resin portion and the common mold. Thus, when the molding in the secondary mold is performed subsequently, the light non-transmissive resin fed under pressure to the inside of the cavity is introduced into the clearance, which appears as a "covering" formed by the light non-transmissive resin on the side surface of the light transmissive resin portion.

Since this kind of clearance occurring in the light transmissive resin portion occurs in a non-uniform state, the "covering" formed by the light non-transmissive resin introduced into the clearance is also non-uniform. As a result, a mottled light non-transmissive resin is integrally molded on the surface of the light transmissive resin, which causes degradation in appearance quality of the light transmissive resin portion or the front cover.

An object of the present disclosure is to provide a two-color molding method and a two-color molding mold which are able to prevent degradation in appearance quality that is caused by resin shrinkage in such a resin portion. In addition, another object of the present disclosure is to provide a two-color molded article with a high appearance quality that is molded using the two-color molding method and the two-color molding mold of the present disclosure.

According to an aspect of the present disclosure, there is provided a two-color molding method including: molding a first resin portion by a common mold and a primary mold; and molding a second resin portion on a first surface of the first resin portion by the common mold and a secondary mold. When molding the second resin portion, a part of the second resin portion is formed as a cover portion that covers a second surface of the first resin portion which is adjacent to the first surface.

According to a second aspect of the present disclosure, there is provided a two-color molding mold including: a common mold; a primary mold configured to mold a first resin portion together with the common mold; and a secondary mold configured to mold a second resin portion on a first surface of the first resin portion together with the common mold. The secondary mold includes a gap that exposes a second surface of the first resin portion which is adjacent to the first surface, within a cavity.

According to a third aspect of the present disclosure, there is provided a two-color molded article including: a first resin portion; and a second resin portion that is integrally molded on a first surface of the first resin portion. A cover portion is formed on a second surface of the first resin portion which is adjacent to the first surface, in which the cover portion is formed of a part of the second resin portion.

In the third aspect, the cover portion is formed on the entire second surface of the first resin portion or a part of the second surface of the first resin portion. In addition, the first resin portion is a light transmissive resin portion, and the second resin portion is a light non-transmissive resin portion. The cover portion is constituted with a part of the light non-transmissive resin portion, and provided on a peripheral side surface of the light transmissive resin portion which serves as the second surface.

According to the first aspect of the present disclosure, since the cover portion that covers the second surface of the first resin portion which is adjacent to the first surface is formed by a part of the second resin portion at the time of molding the second resin portion, the part of the second resin portion is not formed non-uniformly on the second surface of the first resin portion. Thus, it is possible to mold a two-color molded article in which the appearance of the first resin portion or the second surface is improved.

According to the second aspect, since the secondary mold includes the gap that exposes the second surface of the first resin portion which is adjacent to the first surface within the cavity, a part of the second resin portion is uniformly formed on the second surface of the first resin portion, it is possible to mold a two-color molded article in which the appearance of the first resin portion or the second surface is improved.

According to the third aspect, since the cover portion formed by a part of the second resin portion is formed on the second surface of the first resin portion which is adjacent to the first surface, the cover portion can be formed uniformly so that the appearance of the first resin portion or the second surface is improved. In particular, when the peripheral side surface of the light transmissive resin portion is configured to include the cover portion that is constituted with a part of the light non-transmissive resin portion, the peripheral side surface of the light transmissive resin portion is uniformly covered by a part of the light non-transmissive resin portion. Thus, the appearance of the light transmissive resin portion or the peripheral side surface is improved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Figure 1:
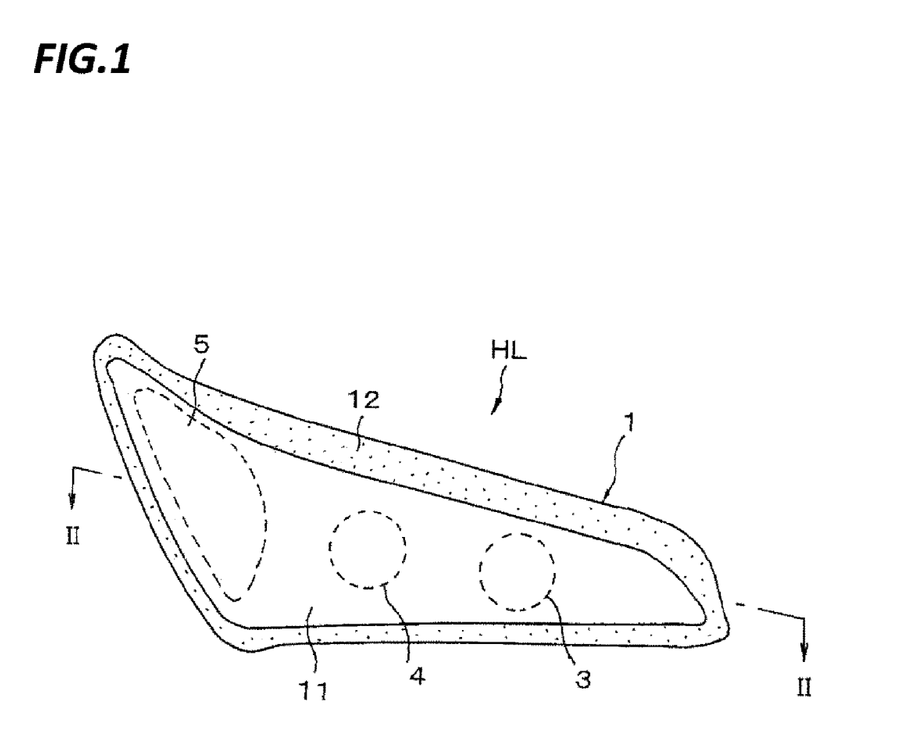
FIG. 1 is a front view of a front cover of a vehicular headlamp to which the present disclosure is applied.
Figure 2A:
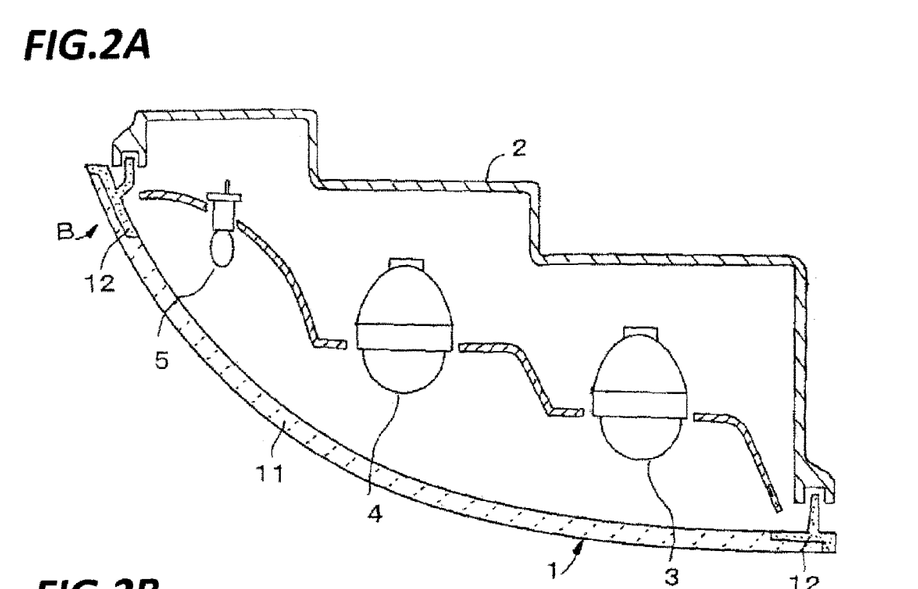
FIG. 2A is a sectional view taken along line II-II in FIG. 1.
Figure 2B:
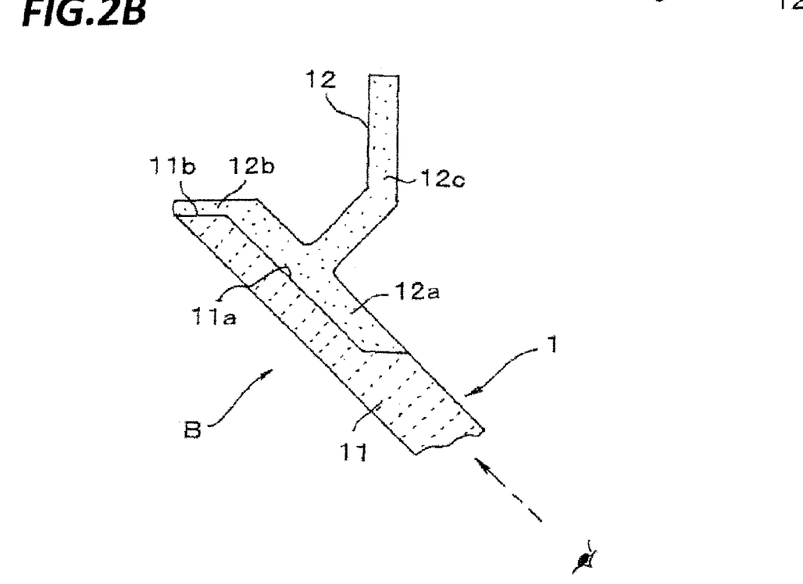
FIG. 2B is a view illustrating a portion "B" in FIG. 2A in an enlarged scale.

Next, exemplary embodiments of the present disclosure will be described with reference to the accompanying drawings. FIG. 1 is a front view illustrating an exemplary embodiment in which a two-color molded article of the present disclosure is applied to a front cover of a headlamp HL placed on a right front portion of a vehicular body. FIG. 2A is a sectional view taken along line II-II in FIG. 1, and FIG. 2B is a view illustrating a portion "B" in FIG. 2A in an enlarged scale. As illustrated in these drawings, the front cover 1 is integrally mounted on an opening portion of a front-opened container-shaped lamp body 2 so as to form a lamp housing of the headlamp HL. The front cover 1 includes a light transmissive resin portion 11 that is molded with a colorless and transparent light transmissive resin, and a black resin portion 12 that is laminated in a thickness direction in the peripheral edge portion of the light transmissive resin portion 11, and molded with a black resin.

Here, the light transmissive resin portion 11 is a first resin portion in the present disclosure, and the black resin portion 12 is a second resin portion in the present disclosure. In addition, in the light transmissive resin portion 11, a transparent region in which the black resin portion 12 is not formed, is configured as an effective lighting portion that transmits the light emitted from a lamp unit mounted within the lamp housing so that the light is irradiated to a region in front of the headlamp HL. In the present exemplary embodiment, a high beam lamp unit 3, a low beam lamp unit 4, and a clearance lamp unit 5 are mounted as lamp units within the lamp housing. Meanwhile, while the black resin portion is configured as a non-effective lighting portion that does not transmit the light emitted from each of the lamp units 3, 4, 5, the black resin portion also functions as a screen that prevents a peripheral edge region within the lamp housing from being revealed to the outside through the light transmissive resin portion.

The light transmissive resin portion 11 is curved following the shape of the front portion of the body of a vehicle (not illustrated), and formed in a plate shape that corresponds to the shape of the opening portion of the lamp body 2 in the front view. In addition, the light transmissive resin portion 11 is formed in a thin thickness along the peripheral edge portion 11a thereof, and a part of the black resin portion 12 is formed on the peripheral edge portion 11a as a laminated portion 12a. In the present exemplary embodiment, adjacent to the peripheral edge portion 11a of the light transmissive resin portion 11 and on a plate thickness direction surface 11b that extends from the peripheral edge portion 11a to the outer surface of the light transmissive resin portion 11 (hereinafter, the surface will be referred to as a "peripheral side surface"), the other portion of the black resin portion 12 is also formed over the entire peripheral side surface as a cover portion 12b with a predetermined thickness. The peripheral edge portion 11a of the light transmissive resin portion 11 is a first surface in the present disclosure and the peripheral side surface 11b is a second surface in the present disclosure.

On the black resin portion 12, a leg portion 12c with a predetermined length is formed to protrude toward the inner surface from the laminated portion 12a of the black resin portion 12, which is embedded in the peripheral edge portion 11a of the light transmissive resin portion 11. The leg portion 12c is provided to extend along the peripheral edge portion of the front cover 1 as an attachment frame of the front cover 1, and constitutes the lamp housing by being bonded or fused to the opening portion of the lamp body 2. FIG. 2A illustrates an example in which the tip end of the leg portion 12c is fixed within a groove formed in the opening edge of the lamp body 2 by an adhesive. In addition, as described above, the black resin portion 12 is provided in order to obtain a design effect of trimming the peripheral edge portion of the front cover 1.

Figure 3A:
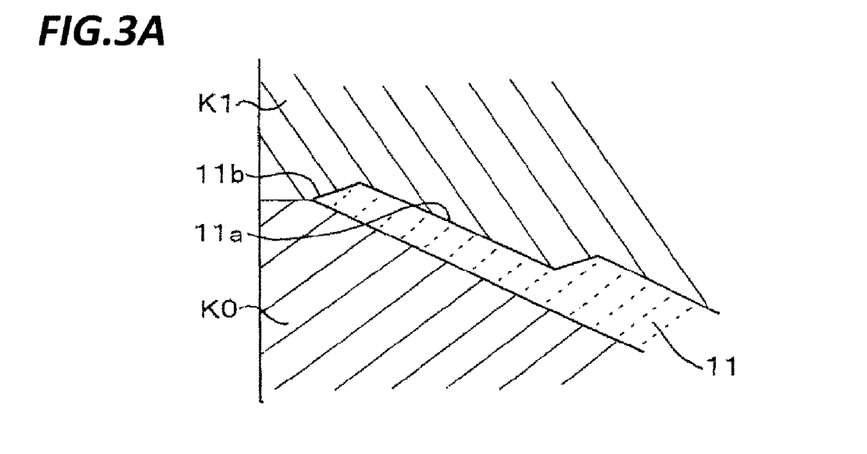
FIGS. 3A and 3B are sectional views of a principal portion for describing the two-color molding technique of the present disclosure.
Figure 3B:
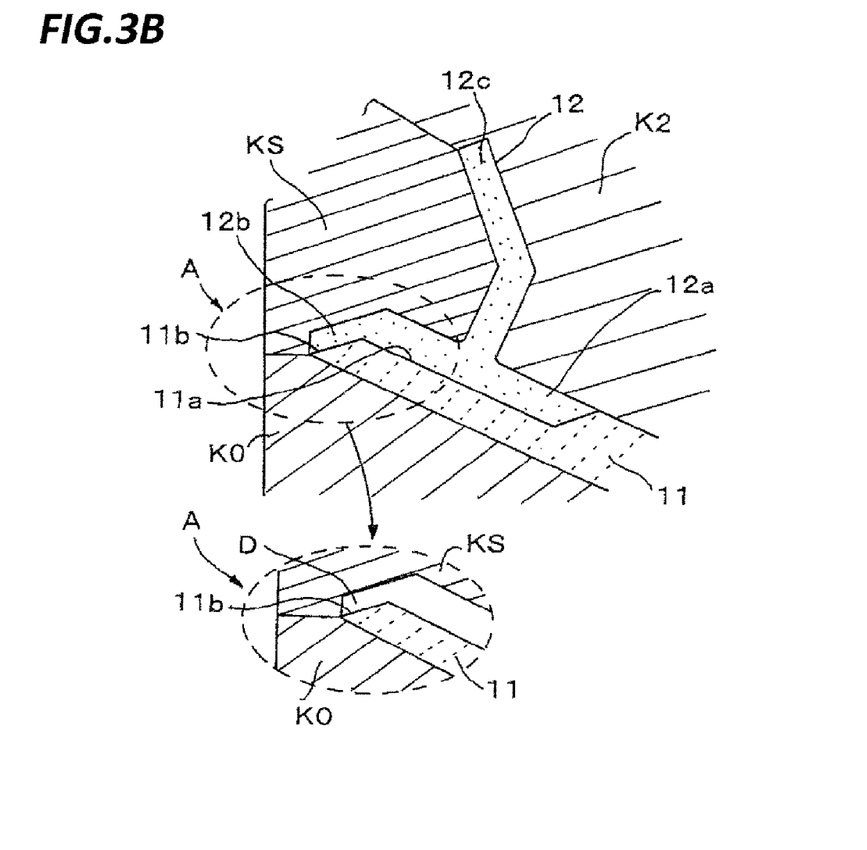

FIGS. 3A and 3B are sectional views of molds for describing a method of manufacturing the front cover described above. FIG. 3A illustrates a state in which the light transmissive resin portion 11 is molded by a common mold K0 and a primary mold K1, and FIG. 3B illustrates a state in which the black resin portion 12 is molded by the common mold K0 and a secondary mold K2 after the light transmissive resin portion 11 is molded. Here, since an undercut exists on the leg portion 12c of the black resin portion 12, a slider KS is provided in the secondary mold K2.

As illustrated in FIG. 3A, the peripheral side surface 11b of the light transmissive resin portion 11 is molded in a parting surface with the primary mold K1. In addition, FIG. 3B also illustrates a portion "A" of the mold prior to molding the black resin portion 12. When the black resin portion 12 is molded, a predetermined gap D is formed in a region facing the peripheral side surface 11b of the light transmissive resin portion 11 in the secondary mold K2. Here, among the cavity surfaces of the secondary mold K2, the gap D is formed by retreating a region of the slider KS, which faces the peripheral side surface 11b of the light transmissive resin portion 11, at a predetermined interval with respect to the peripheral side surface 11b. Accordingly, when the black resin portion 12 is molded, the black resin fed under pressure to the inside of the cavity is fed under pressure to the gap D, and molded on the peripheral side surface 11b of the light transmissive resin portion 11 in a layer form, thereby forming the cover portion 12b illustrated in FIG. 2B.

Figure 4A:
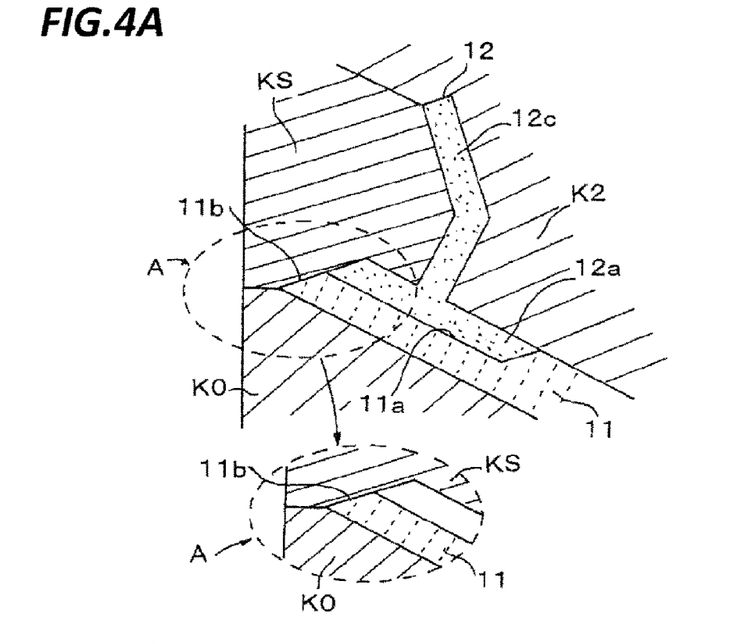
FIGS. 4A and 4B are sectional views of a principal portion for describing a two-color molding technique that is compared to the present disclosure.
Figure 4B:
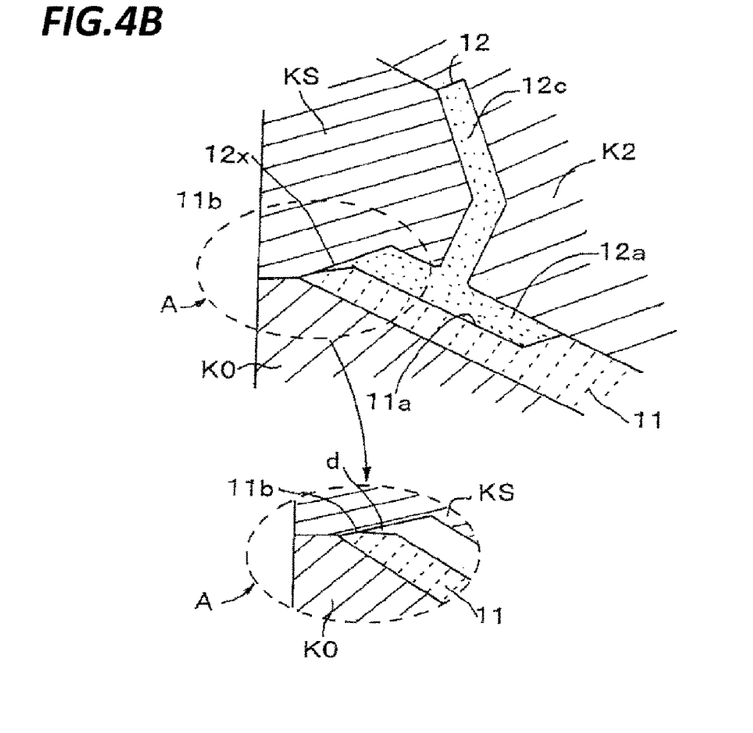

Here, FIG. 4A is a view compared to FIG. 3B and also illustrates the portion "A" prior to molding the black resin portion 12. As illustrated in the portion "A", the gap D facing the peripheral side surface 11b of the light transmissive resin portion 11 does not exist in the cavity of the secondary mold K2. When resin shrinkage occurs in the peripheral edge portion 12a of the light transmissive resin portion 11 molded by the primary mold K1, a fine clearance d occurs between the peripheral side surface 11b of the light transmissive resin portion 11 and the parting surface of the slider KS of the secondary mold K2, as illustrated in the portion "A" in FIG. 4B. For that reason, when the black resin portion 12 is molded in the secondary mold K2, the black resin fed under pressure to the inside of the cavity is introduced into the clearance d so that a covering 12x made of the black resin is formed on the peripheral side surface 11b of the light transmissive resin portion 11.

Figure 5A:
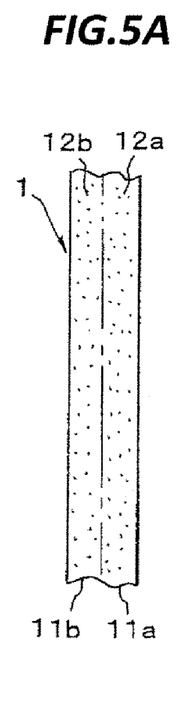
FIGS. 5A to 5C are schematic views for describing appearances obtained by techniques that are compared to the present disclosure, and the present disclosure.
Figure 5B:
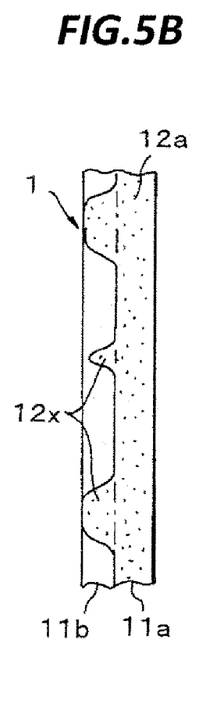

The resin shrinkage occurring in the peripheral edge portion 11a of the light transmissive resin portion 11 does not always occur uniformly along the peripheral direction. Thus, the clearance d occurring in the peripheral side surface 11b of the light transmissive resin portion 11 also becomes non-uniform so that the covering 12x formed by the black resin introduced into the clearance d also becomes non-uniform. As a result, as schematically illustrated in FIG. 2B, when the peripheral side surface 11b of the light transmissive resin portion 11 is observed through the light transmissive resin portion 11 from the front side of the front cover 1, a mottled black resin layer by the "covering" 12x is observed on the peripheral side surface 11b as illustrated in FIG. 5B, which degrades the appearance quality of the light transmissive resin portion 11 or the front cover 1.

Whereas, as illustrated in FIG. 3B, when the gap D corresponding to the peripheral side surface 11b of the light transmissive resin portion 11 is formed in advance in the secondary mold K2, the molded black resin portion 12 is formed as a cover portion 12b that covers the peripheral side surface 11b with the black resin by being fed under pressure from the peripheral edge portion 11a of the light transmissive resin portion 11 to the peripheral side surface 11b adjacent thereto. By forming the cover portion 12b, which covers the peripheral side surface 11b of the light transmissive resin portion 11 with the black resin portion 12, in this way, the black portion is observed uniformly without unevenness on the peripheral side surface 11b of the light transmissive resin portion 11 as illustrated in FIG. 5A when the peripheral side surface 11b is observed through the front cover 1 from the front side. In addition, the cover portion 12b is observed as being united together with the black resin portion 12a of the peripheral edge portion 11a of the light transmissive resin portion 11. Thus, the peripheral side surface 11b of the light transmissive resin portion 11 has an appearance in which no "covering" exists, and thus the appearance quality of the light transmissive resin portion 11 or the front cover 1 is improved.

Figure 6A:
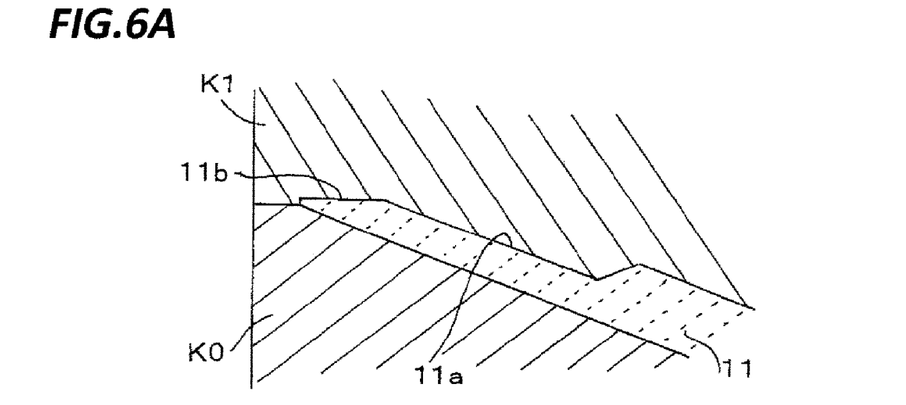
FIGS. 6A and 6B are sectional views illustrating a principal portion of a modification of the present disclosure.
Figure 6B:
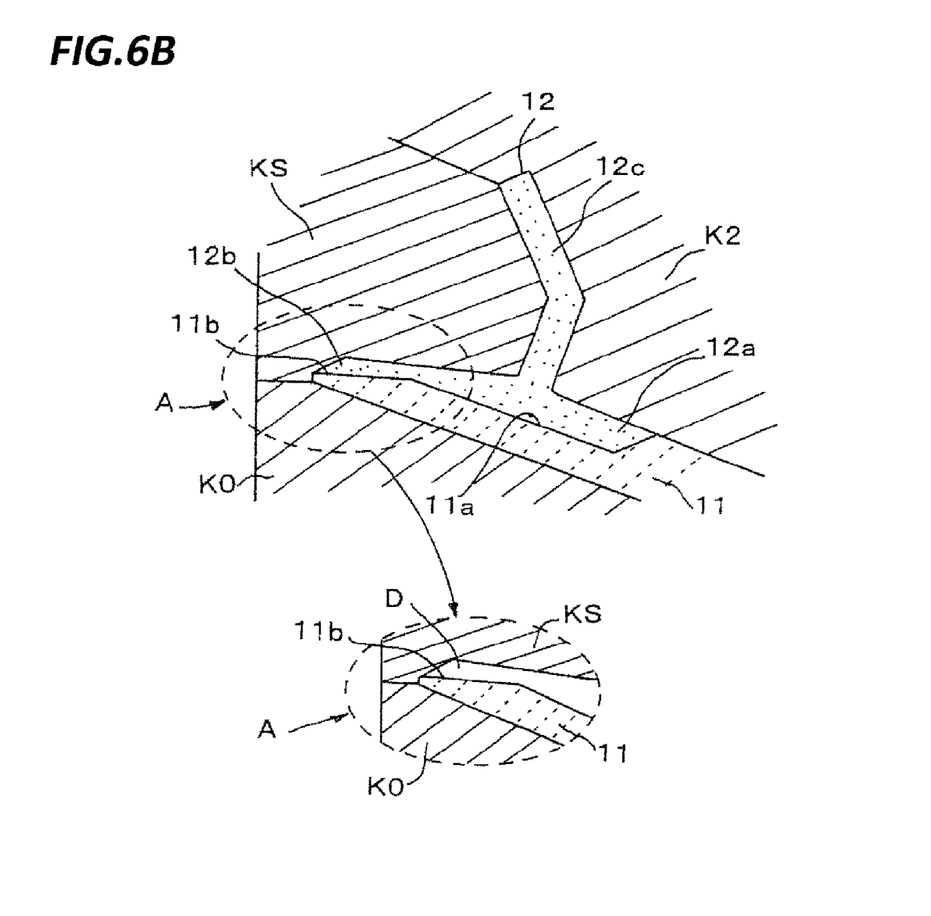

FIGS. 6A and 6B are sectional views illustrating an exemplary front cover that uses a light transmissive resin portion 11 with a peripheral edge portion 11a having a different sectional shape. Meanwhile, the portions equivalent to those of FIGS. 3A and 3B are denoted by the same symbols. In this example, as illustrated in FIG. 6A, the peripheral side surface 11b, which is adjacent to the peripheral edge portion 11a of the light transmissive resin portion 11 molded by the common mold K0 and the primary mold K1, is formed as a surface that intersects the peripheral edge portion 11a at an acute angle.

In addition, a state prior to molding the black resin portion 12 is also illustrated in a portion "A" in FIG. 6B. As illustrated in the portion "A", a gap D is formed in a region that faces the peripheral side surface 11b around the principal surface of the light transmissive resin portion 11 within the cavity of the secondary mold K2 which is for use in molding the black resin portion 12 after molding the light transmissive resin portion 11. Thus, as illustrated in FIG. 6B, the black resin, which is fed under pressure to the inside of the cavity of the secondary mold K2 when the black resin portion 12 is molded, is fed under pressure to the gap D so that the cover portion 12b is formed to cover the entire peripheral side surface 11b of the light transmissive resin portion 11.

Even in this front cover, the cover portion 12b formed on the peripheral side surface 11b of the light transmissive resin portion 11 is integrated with the black resin portion 12 formed on the peripheral edge portion 11a of the light transmissive resin portion 11. Thus, when the peripheral side surface 11b of the light transmissive resin portion 11 is observed through the front cover from the front side, the black portion is observed uniformly without unevenness on the peripheral side surface 11b as illustrated in FIG. 5A. As a result, the peripheral side surface 11b of the light transmissive resin portion 11 has an appearance in which no "covering" exists so that the appearance quality of the light transmissive resin portion 11 or the front cover 1 is improved.

In the exemplary embodiments described above, the cover portion 12b, formed of the black resin on the peripheral side surface 11b of the light transmissive resin portion 11, is formed to have a substantially uniform thickness over the entire peripheral side surface 11*b*. However, the thickness may not be uniform. In particular, a black resin has little impact on appearance so long as its thickness does not extremely vary, and thus the thickness may vary within a predetermined range. A relatively light-colored resin has impact on appearance depending on a difference in thickness, and thus such a colored resin may be formed to have a uniform thickness as described in exemplary embodiments.

Figure 7A:
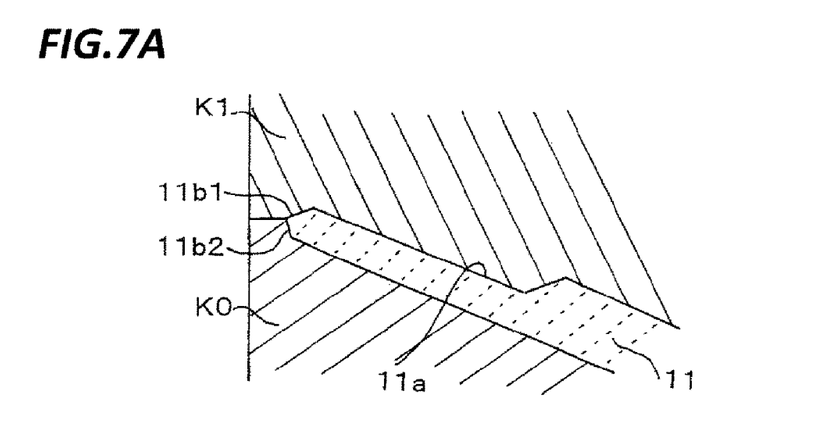
FIGS. 7A and 7B are sectional views illustrating a principal portion of another modification of the present disclosure.
Figure 7B:
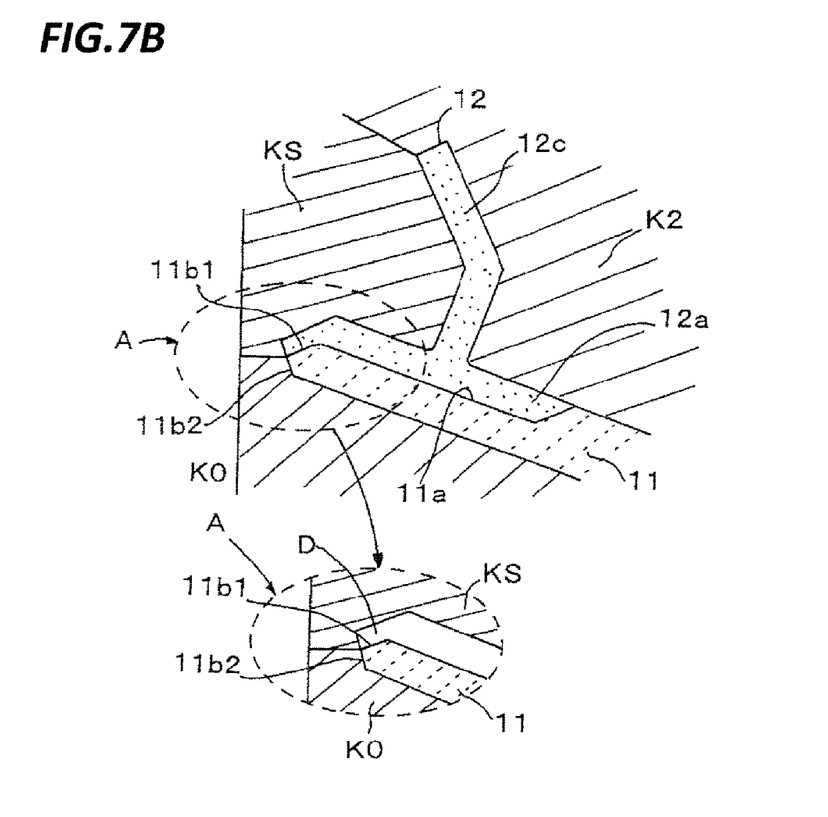

In addition, in the present disclosure, the black resin cover portion 12*b* may be formed on only a part of the peripheral side surface 11*b* in the thickness direction rather than being formed over the entire peripheral side surface 11*b* of the light transmissive resin portion 11. FIGS. 7A and 7B are sectional views of such an exemplary embodiment. As illustrated in FIG. 7A, the present exemplary embodiment is an example in which the light transmissive resin portion 11 molded by the common mold K0 and the primary mold K1 has a peripheral side surface 11*b* which is formed in a triangular taper shape rather than in a flat shape. That is, the peripheral side surface 11*b* of the light transmissive resin portion 11 is formed by an inner taper surface 11*b*1 and an outer taper surface 11*b*2 in the thickness direction. The inner taper surface 11*b*1 and the outer taper surface 11*b*2 intersect at a predetermined angle.

In addition, a state prior to molding the black resin portion 12 is also illustrated in a portion "A" in FIG. 7B. As illustrated in the portion "A", when the black resin portion 12 is formed by the common mold K0 and the secondary mold K2, a gap D is formed in a region facing the inner taper surface 11*b*1 among the peripheral side surfaces of the light transmissive resin portion 11 within the cavity of the secondary mold K2. Thus, the cover portion 12*b* formed of the black resin as a part of the black resin portion 12 is only formed on the inner taper surface 11*b*1 of the peripheral side surface 11*b* of the light transmissive resin portion 11.

Figure 5C:
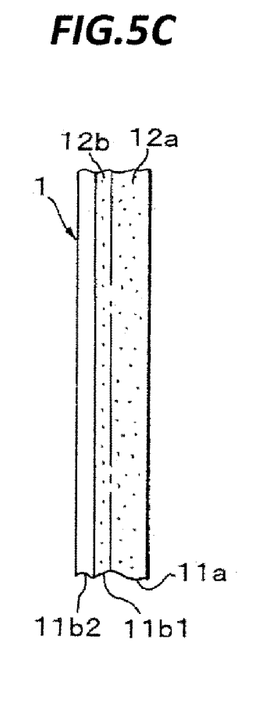

In the light transmissive resin portion 12 with the peripheral side surface 11*b* having the triangular taper shape formed as described above, the cover portion 12*b* formed of the black resin is only formed on the inner taper surface 11*b*1, as illustrated in FIG. 7B. Accordingly, in the front cover with this configuration, when the peripheral side surface 11*b* of the light transmissive resin portion 11 is observed through the front cover from the front side, as illustrated in FIG. 5C, the inner taper surface 11*b*1 is observed as the cover portion 12*b* formed of the black resin and the outer taper surface 11*b*2 has a transparent appearance since the cover portion 12*b* formed of the black resin does not exist thereon. That is, the peripheral edge portion of the light transmissive resin portion 11 has an appearance that is bordered with a narrow band-shaped transparent region, which may improve the appearance quality by different appearances of the front cover.

In the present exemplary embodiment, when molding the black resin portion 12 illustrated in FIG. 7B, the light transmissive resin portion 11 undergoes resin shrinkage in the peripheral edge portion 11*a* of the principal surface within the secondary mold K2. Thus, a clearance occurs between the peripheral side surface 11*b* and the cavity surface of the secondary mold K2 as in the above-described exemplary embodiments. However, upon comparing the resin shrinkage in the inner taper surface 11*b*1 of the peripheral side surface 11*b* and the resin shrinkage in the outer taper surface 11*b*2 of the peripheral side surface 11*b*, the outer taper surface 11*b*2 that is in close contact with the common mold K0 is more suppressed from being subjected to a temperature drop than the inner taper surface 11*b*1 that is opened to the cavity of the secondary mold K2. Thus, the resin shrinkage is less in the outer taper surface 11*b*2 and the clearance occurring in the outer taper surface 11*b*2 becomes smaller than that in the inner taper surface 11*b*1.

In addition, since the secondary mold K2 forms the gap D in the region facing the inner taper surface 11*b*1, the force at the time of feeding the black resin under pressure is suppressed when the black resin fed under pressure to the inside of the cavity is introduced into the gap D. In addition, the inner taper surface 11*b*1 and the outer taper surface 11*b*2 are arranged with a top edge being interposed therebetween in which the top edge is not a flat surface but has a triangular taper shape. Thus, the black resin, which is fed under pressure to the gap D so that the force for feeding the black resin under pressure is reduced, is molded as the cover portion 12*b* of the inner taper surface 11*b*1. However, the force of causing the black resin to be fed under pressure from the inner taper surface 11*b*1 to the clearance of the outer taper surface 11*b*2 disappears. Thus, the black resin is hardly introduced into the clearance of the outer taper surface 11*b*2 so that the "covering" is suppressed from occurring on the outer taper surface 11*b*2.

As described in each of the exemplary embodiments above, when the peripheral side surface of the light transmissive resin portion is a flat surface, a part of the black resin portion is formed as a cover portion on the entire peripheral side surface. Thus, the peripheral side surface is wholly covered by the cover portion formed of a black resin so that the black resin is not formed non-uniformly on the peripheral side surface and the peripheral side surface exhibits a uniform black appearance, which prevents deterioration of the appearance. Meanwhile, when the peripheral side surface of the light transmissive resin portion is not a flat surface, for example, when the peripheral side surface is a curved surface with a triangular taper shape, a part of the black resin portion is formed in the inner region of the peripheral side surface as the cover portion so that the black resin is not formed non-uniformly to the outer region of the peripheral side surface. The inner region of the peripheral side surface exhibits a uniform black appearance and the outer region exhibits a transparent appearance, which prevents deterioration of the appearance.

In the foregoing exemplary embodiments, it has been described that the first resin portion is molded as a light transmissive resin portion, and the second resin portion is molded as a black resin portion. Of course, however, the first resin portion and the second resin portion are not limited to the resins of the exemplary embodiments. That is, the two-color molding of the first resin portion and the second resin portion in this order is applicable to a two-color molded article in which a part of the second resin portion is formed to extend to the side surface of the first resin portion to generate a "covering" so that the appearance quality of the two-color molded article may deteriorate. In particular, the present disclosure may be properly applied to a two-color molding that molds the first resin portion with a light-colored resin, and the second resin portion with a dark-colored resin.

The two-color molded article according to the present disclosure is not limited to a front cover of a headlamp, and is applicable to a molded resin article as long as the article is molded by a primary molding step and a secondary molding step. For example, it may also be applied when molding a front cover of an indicator lamp (a cover at the front side of the lamp) including a vehicular rear lamp through the two-color molding.

The present disclosure may be employed in a two-color molding technique that molds different resins sequentially and integrally.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A two-color molded article comprising:
   a first resin portion that is a light transmissive resin portion; and
   a second resin portion that is a light non-transmissive resin portion, the second resin portion being integrally molded on a first surface of the first resin portion formed on an inner surface of a peripheral edge portion of the first resin portion when viewed from a top,
   wherein a cover portion is formed on a second surface of the first resin portion which is extended to an outer surface of the first resin portion from the first surface of the first resin portion,
   the cover portion is overlapped with the first resin portion in a thickness direction of the first resin portion without extending toward outside from the outer surface of the first resin portion when viewed from a top and formed of a part of the second resin portion such that at least a portion of the cover portion is covered by the first resin portion corresponding to the cover portion when viewed from a side of the outer surface of the first resin portion, and
   the cover portion is constituted with a part of the light non-transmissive resin portion, and provided on a peripheral side surface of the light transmissive resin portion which serves as the second surface.

2. The two-color molded article of claim 1, wherein the cover portion is formed on an entire second surface of the first resin portion.

3. The two-color molded article of claim 1, wherein the cover portion is formed on a part of the second surface of the first resin portion.

4. The two-color molded article of claim 1, wherein the first resin portion and the second resin portion form a front cover of a vehicular lamp, and the peripheral side surface is a side surface extending along a peripheral edge portion of the front cover.

5. The two-color molded article of claim 1, wherein the second surface of the first resin portion intersects the first surface of the first resin portion at an acute angle.

6. The two-color molded article of claim 1, wherein the second surface of the first resin portion includes an inner taper surface and an outer taper surface with reference a thickness direction of the first resin portion.

* * * * *